(12) United States Patent
Takahashi

(10) Patent No.: US 6,729,429 B2
(45) Date of Patent: May 4, 2004

(54) DISTANCE MEASURING SENSOR MOUNTING STRUCTURE

(75) Inventor: Akio Takahashi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 169 days.

(21) Appl. No.: 10/077,926

(22) Filed: Feb. 20, 2002

(65) Prior Publication Data

US 2002/0125383 A1 Sep. 12, 2002

(30) Foreign Application Priority Data

Mar. 12, 2001 (JP) .................................... P. 2001-069278

(51) Int. Cl.⁷ .............................................. B60R 21/00
(52) U.S. Cl. ....................... 180/271; 180/311; 248/200; 280/781; 293/102; 293/115; 293/117; 296/203.01
(58) Field of Search ................................. 180/271, 167, 180/169, 311; 248/200; 296/203.01; 280/781; 293/102, 106, 115, 117

(56) References Cited

U.S. PATENT DOCUMENTS 5,326,133 A * 7/1994 Breed et al. ................. 280/735
5,875,408 A * 2/1999 Bendett et al. ............... 701/23

FOREIGN PATENT DOCUMENTS

JP 54-49728 * 4/1979 .................. 180/169
JP 7-125567 5/1995

* cited by examiner

*Primary Examiner*—Eric Culbreth
(74) *Attorney, Agent, or Firm*—Arent Fox PLLC

(57) ABSTRACT

A distance measuring sensor mounting structure includes a bulkhead upper frame, a front bumper beam situated below the bulkhead upper frame and diagonally to the front thereof and at least two sensor brackets each having a distance measuring sensor fixedly supported thereon. At least two sensor brackets are installed at predetermined positions between the bulkhead upper frame and the front bumper beam to connect the bulkhead upper frame to the front bumper beam.

6 Claims, 7 Drawing Sheets

DISTANCE MEASURING SENSOR MOUNTING STRUCTURE

BACKGROUND OF THE INVENTION

1. Field of the Invention

The present invention relates to a mounting structure for distance measuring sensors provided at the front of an automotive vehicle.

2. Description of the Related Art

In measuring a distance between the subject vehicle and a vehicle running or obstacle existing ahead of the subject vehicle by detecting the vehicle or obstacle, since it is not a close distance that is to be measured, a method is adopted which utilizes a triangulation in order to measure the distance accurately.

Consequently, distance measuring sensors need to be disposed on at least two positions, a distance between which is known for a required measurement. And, in view of the distance measuring performance, the longer the distance between the two positions becomes, the more accurate a resultant measurement becomes. An example of such a distance measuring sensor placement is disclosed in JP-A-7-125567.

In the example, a CCD camera is used as a distance measuring sensor, and two CCD cameras each installing into its body, electronic components such as an image circuit board and a diaphragm circuit board are provided at positions apart from each other by a predetermined distance.

Unless the relative position between the two CCD cameras is maintained, no high-accuracy distance measurement can be expected. However, there is disclosed in the example no description of a distance measuring sensor mounting structure which can secure the accuracy of the relative position of the two CCD cameras.

SUMMARY OF THE INVENTION

The invention was made in view of the situation, and an object thereof is to provide a distance measuring sensor mounting structure which can not only maintain the high accuracy of a relative position between two distance measuring sensors while the sensors keep a required relative distance between them but also increase the rigidity of the body of a vehicle.

With a view to attaining the object, according to a first aspect of the invention, there is provided a distance measuring sensor mounting structure wherein at least two sensor brackets each having a distance measuring sensor fixedly supported thereon are provided at predetermined positions on an automotive body frame structure in such a manner as to extend between a bulkhead upper frame and a front bumper beam situated below the bulkhead upper frame diagonally to the front to connect the bulkhead upper frame to the front bumper beam.

The bulkhead upper frame and the front bumper beam are respectively directed transversely and joined to the body of a vehicle to form a strong structure which constitutes the front of the body.

Since at least two sensor brackets are provided to extend between the bulkhead upper frame and the front bumper beam which are disposed in parallel to each other, the rigidity of the overall structure can be increased, whereby the improvement in rigidity of the body of the vehicle can be attained.

In addition, since the distance measuring sensor is fixedly supported on each sensor bracket which constitutes the highly rigid structure, the high accuracy of the relative position of the distance measuring sensors can be secured, enabling a highly accurate distance measurement.

Furthermore, since the distance measuring sensors are fixed to the sensor brackets which are provided to extend between the bulkhead upper frame and the front bumper beam, the distance measuring sensors can be disposed to face the front grille without disposing therebetween any obstacle such as glass which would deteriorate the performance of the sensors.

According to a second aspect of the invention, there is provided a distance measuring sensor mounting structure as set forth in the first aspect of the invention, wherein the sensor bracket comprises a bottom plate and a back plate which are disposed to form an L-shape as viewed from the side, wherein a rib is formed on the sensor bracket in such a manner as to connect the edge of the bottom bracket to the edge of the back plate, and wherein the bottom plate is fixedly attached to the front bumper beam whereas the back plate is fixedly attached to the bulkhead upper frame.

Since in the sensor bracket the ribs connect together the edges of the bottom and back plates which are formed into the L-shape, the rigidity of the sensor bracket itself is improved, whereby the mounting strength of the distance measuring sensor can be maintained much higher.

DETAILED DESCRIPTION OF THE PREFERRED EMBODIMENTS

Figure 1:
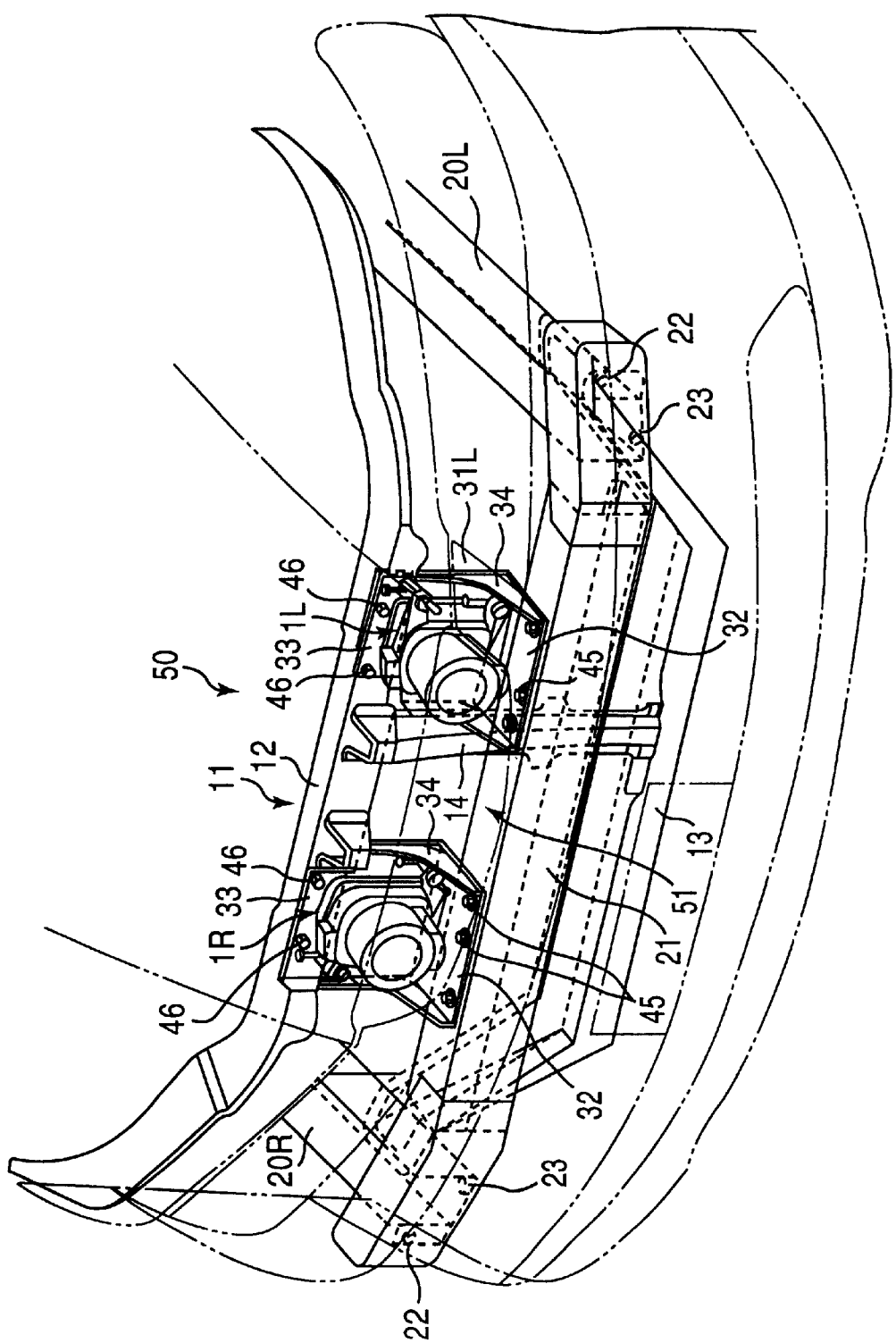
FIG. 1 is a perspective view showing a front vehicle body frame structure of an automotive vehicle according to an embodiment of the invention.
Figure 2:
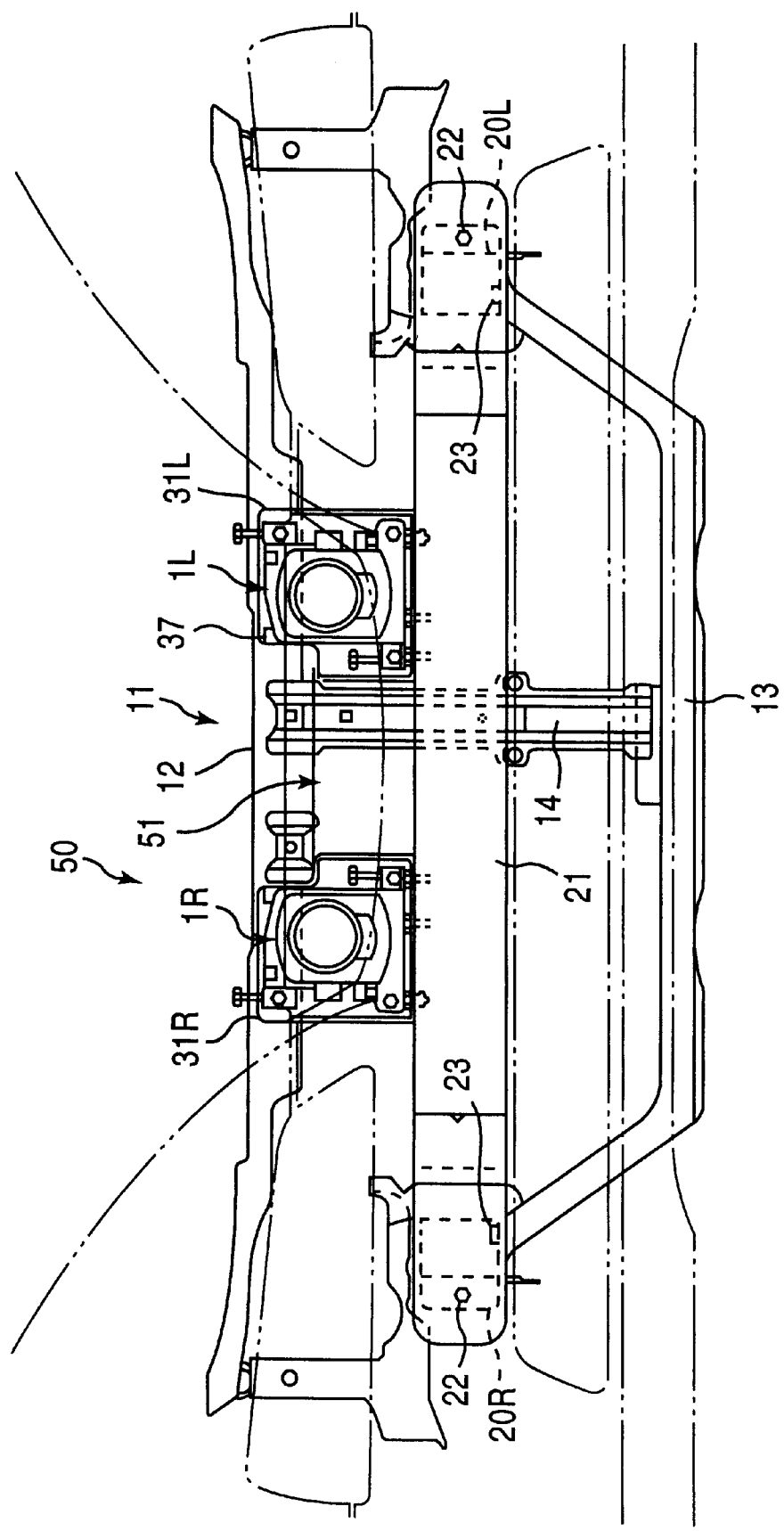
FIG. 2 is a front view of the structure.
Figure 3:
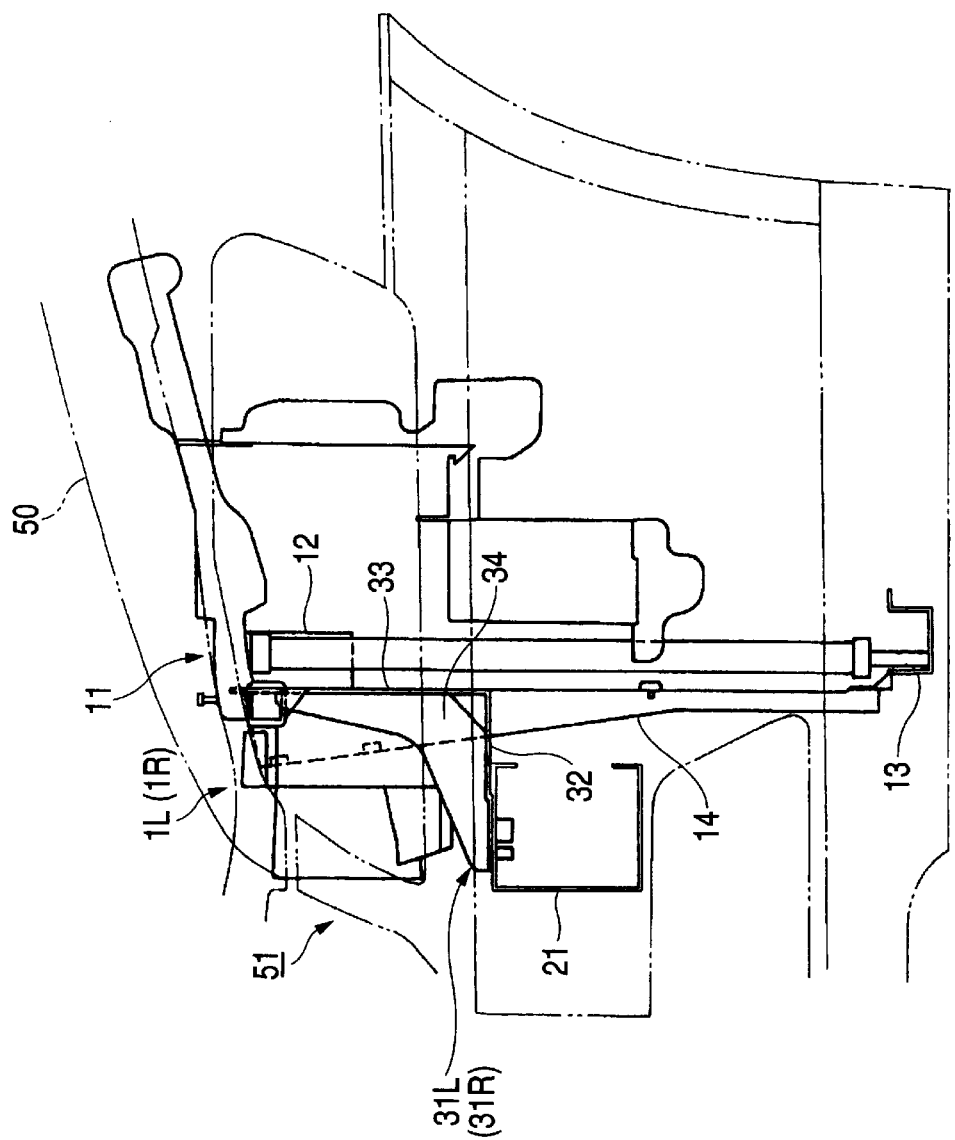
FIG. 3 is a side of the structure.
Figure 4:
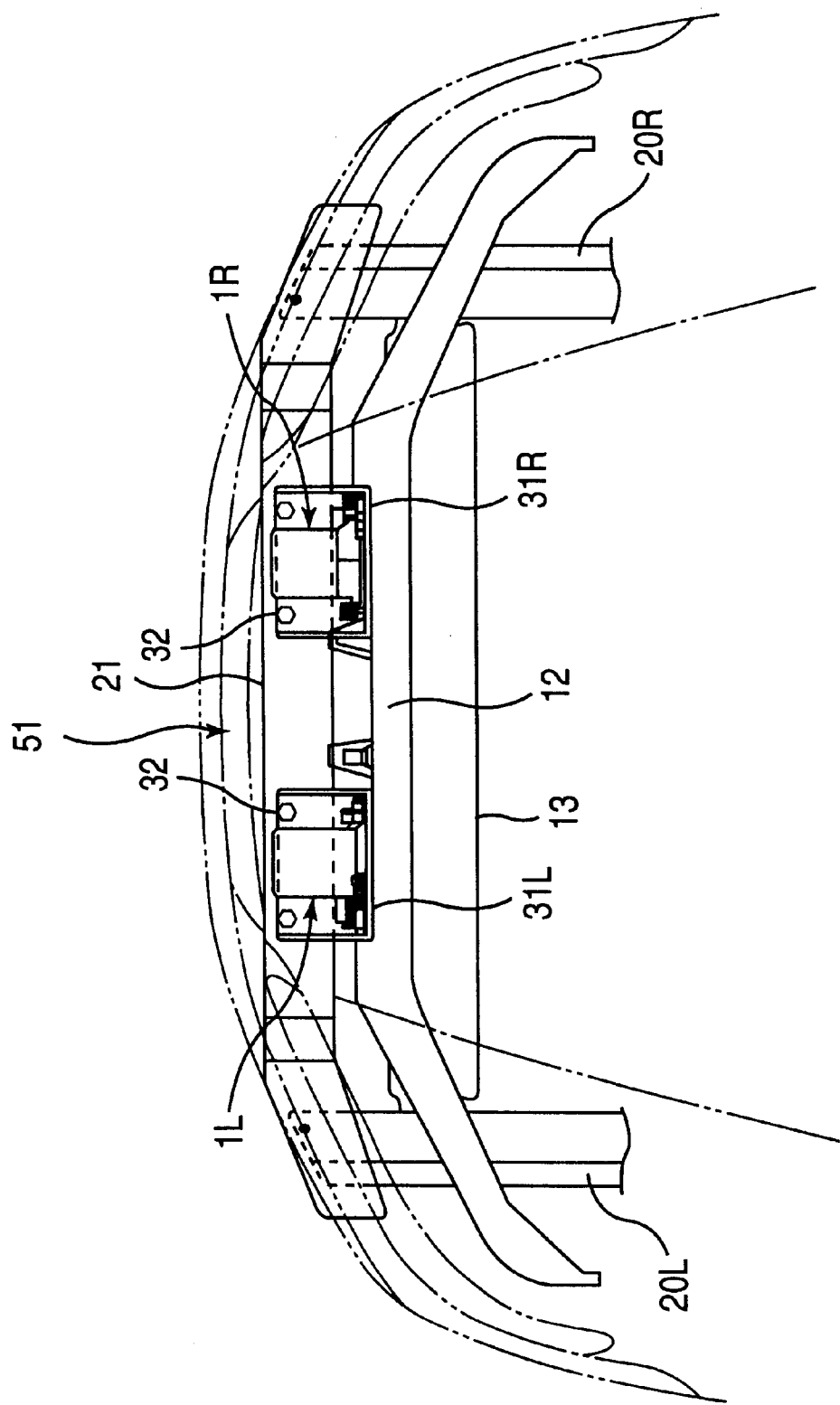
FIG. 4 is a plan view of the structure.

Referring to FIGS. 1 to 6, an embodiment according to the invention will be described below.

A distance measuring sensor according to the embodiment is constituted by a infrared camera, and two infrared cameras 1L, 1R are disposed at transversely symmetrical positions at the front of the body of a vehicle.

A front bulkhead 11 constituting a front part of the vehicle body includes a transversely and horizontally directed bulkhead upper frame 12, a front lower cross member 13 extending in parallel to the bulkhead upper frame therebelow and a center stay 14 connecting between central portions of the bulkhead upper frame 12 and the front lower cross member 13 which are disposed vertically.

The bulkhead upper frame 12 constituting an upper part of the front bulkhead 11 connects to left and right wheel houses which are part of the main body of the vehicle. Left and right side portions of the front lower cross member 13 constituting a lower part of the front bulkhead 11 are curved obliquely upwardly so as to connect at left and right upper ends thereof to left and right side frames 20L, 20R, respectively, which are part of the main body of the vehicle.

Consequently, the bulkhead upper frame 12 and the front lower cross member 13 which are disposed vertically are both connected to the main body of the vehicle, thereby constituting a highly rigid structure.

On the other hand, the left and right side frames 20L, 20R which are directed longitudinally protrude more frontward than the front bulkhead 11, and a front bumper beam 21 directed transversely is provided in such a manner as to extend between left and right distal ends of the left and right side frames 20L, 20R.

Distal ends of the side frames 20L, 20R are fitted in U-shaped portions opened in the back side the front bumper beam 21 at left and right end portions thereof and are then fixedly attached thereto with bolts 22, 23.

The front bumper beam 21 is located ahead of the front bulk head 11 at a height between the bulkhead upper frame 12 and the front lower cross member 13.

Consequently, the front bumper beam 21 is disposed below and in parallel with respect to the bulkhead upper frame 12 and diagonally to the front of thereof.

Two sensor brackets 31L, 31R, which are transversely symmetrical with each other, are provided in such a manner as to extend between the bulkhead upper frame 12 and the front bumper beam 21 which are in the aforesaid positional relationship.

Figure 5:
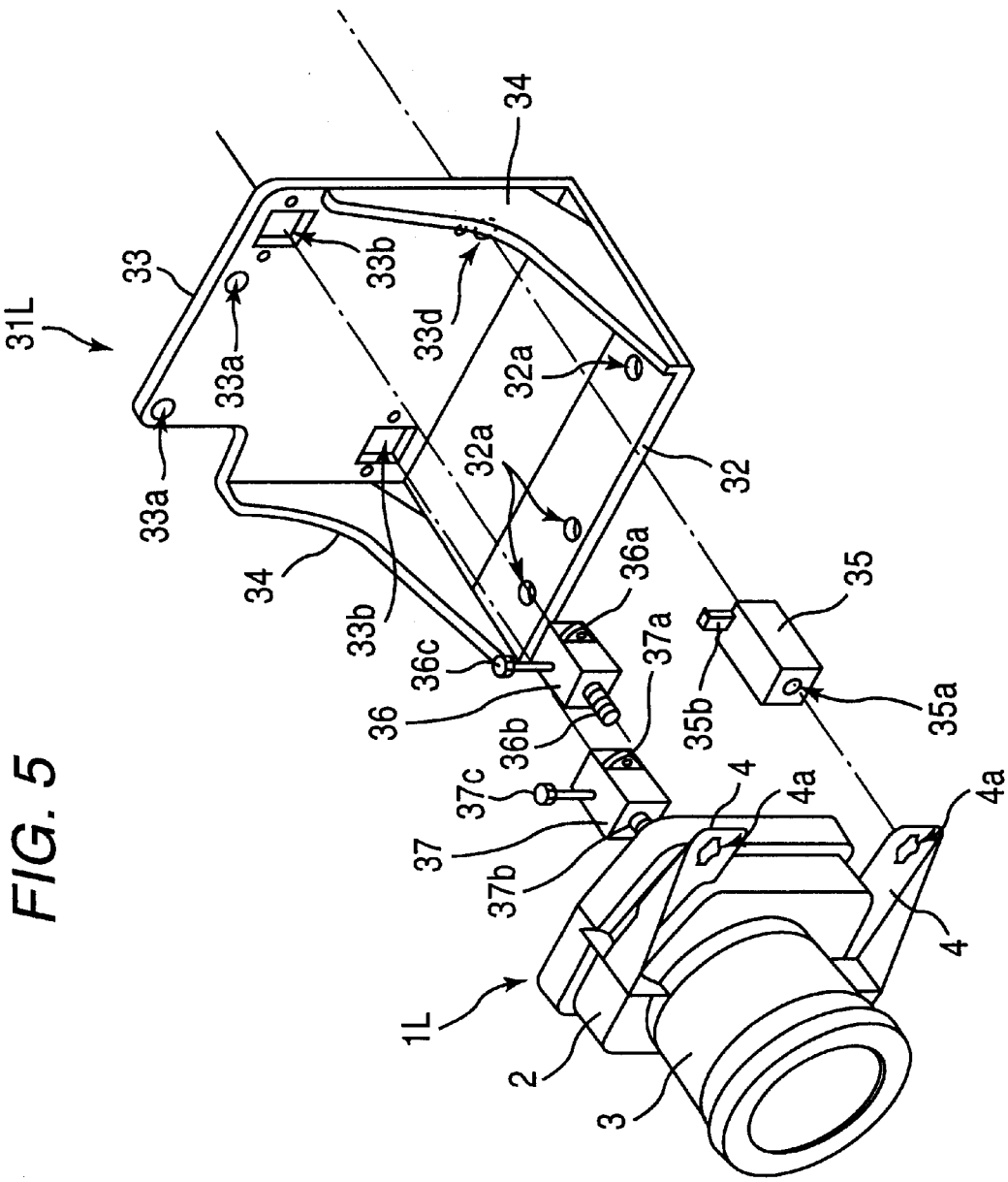
FIG. 5 is a perspective view showing an infrared camera and a sensor bracket.
Figure 6:
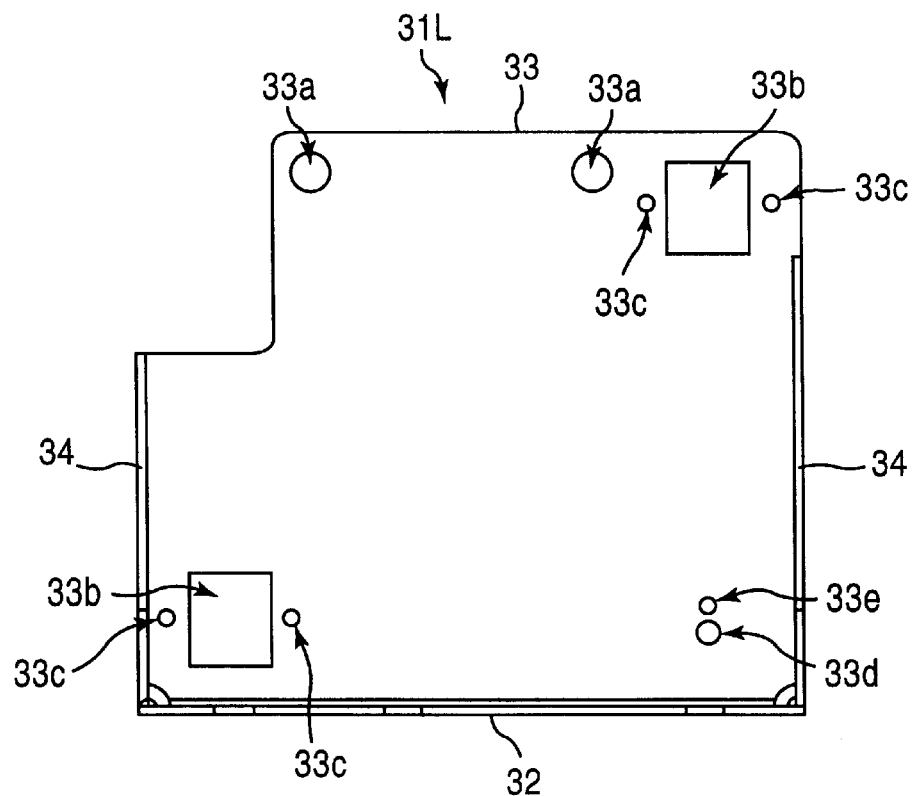
FIG. 6 is a front view of the sensor bracket.

As shown in FIGS. 5 and 6, the left-hand side sensor bracket 31L is formed into an L-shape as viewed from the side with a bottom plate 32 and a back plate 33, and ribs 34, 34 connect the end of an end of the bottom plate 32 and the edge of the back plate 33 to provide a highly rigid structure.

Three attachment holes 32a are provided in the bottom plates 32 of the sensor brackets 31L, 31R along front end portions of the bottom plates 32, and two attachment holes 33a are provided in the back plates 33 of the same sensor brackets along the upper end portions thereof. In addition, two rectangular holes 33b, 33b are formed in the back plates 33 of the respective sensor brackets 31L, 31R at corners which confront each other diagonally for fixing infrared cameras 1L, 1R, and small holes 33c are provided on left and right sides of each rectangular hole 33b. Moreover, a circular hole 33d is formed in the other lower corner portion of the back plate 33 and a small hole 33e is formed above the circular hole 33d.

Note that while the left and right sensor brackets 31L, 31R are formed symmetrically with each other, the sensor brackets may not have to be formed symmetrically but may be formed in the same shape.

On the other hand, the infrared cameras 1L, 1R are each formed into a shape in which a cylindrical portion 3 constituting a lens system protrudes from a rectangular main body portion 2, brackets 4 extend from the main body portion 2, and an attachment hole 4a is provided in each bracket 4 at a distal end thereof.

The left and right infrared cameras 1L, 1R are transversely symmetrical with each other with respect to directions in which the brackets extend.

As shown in FIG. 5, a backside of the infrared camera 1L is confronted with the back plate 33 of the sensor bracket 31L and is then fixed thereto via one reference support member 35 and two adjustable support members 36, 37.

The reference support member 35 is something like a rectangular prism with a predetermined longitudinal length. A bolt hole 35a penetrates longitudinally through the rectangular prism, and an engagement pin 35b protrudes upwardly along a backside of the reference support member 35. Further, an engagement pawl is formed on an upper end of the engagement pin 35b.

The adjustable support members 36, 37 respectively include attachment tab portions 36a, 37a provided on left- and right-hand sides of rectangular prism cases of the adjustable support members 36, 37 in such a manner as to protrude therefrom, and threaded rods 36b, 37b protrude from front sides of the respective rectangular prism cases while adjustment pins 36c, 37c protrude upwardly from upper sides of the respective cases.

Incorporated in the rectangular prism cases of the respective adjustable support members 36, 37 are mechanisms in which when upper ends of the adjustment pins 36c, 37c are turned, the threaded rods 36b, 37b move longitudinally.

The two adjustable support members 36, 37 are fitted in advance into the rectangular holes 33b, 33b in the sensor bracket 31L from the front so that the left and right attachment tab portion 36a, 37a come into alignment with the small holes 33c, and bolts 38 are allowed to penetrate through the holes and be threadedly fitted to nuts 39.

Then, the backside of the infrared camera 1L is caused to face the back plate 33 of the sensor bracket 31L, the reference support member 35 is brought into alignment with the circular hole 33d, and the engagement pawl of the engagement pin 35b is brought into engagement with the small hole 33e to provide a detent. Then, the left lower bracket 4 of the infrared camera 1L is brought into abutment with a front side of the reference support member 35, the threaded rod 36b of the adjustable support member 36 is allowed to penetrate through the attachment hole 4a in the left upper bracket 4, and the threaded rod 37b of the adjustable support member 37 is allowed to penetrate through the attachment hole 4a in the right lower bracket 4.

Figure 7:
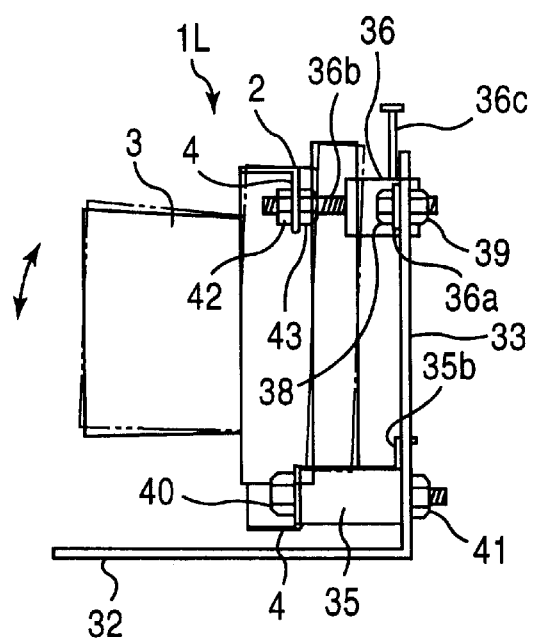
FIG. 7 is a side view showing a state in which the infrared camera is mounted on the sensor bracket.

In this state, a bolt 40 is allowed to penetrate through the attachment hole 4a in the lower left bracket 4 of the infrared camera 1L, the bolt hole 35a in the reference support member 35 and the circular hole 33d in the back plate 33, to be threadedly fastened to a nut 41, whereby the left lower bracket 4 is fixed (refer to FIG. 7).

Thus, the infrared camera 1L is supported on the back plate 33 of the sensor bracket 31L via the single reference support member 35 and the two adjustable support members 36, 37, the left lower bracket 4 is fixedly supported by the reference support member 35, and the left upper bracket 4 and the right lower bracket 4 are adjustably supported by the adjustable support members 36, 37.

Namely, in the adjustable support members 36, 37, since the threaded rods 36b, 37b can be adjusted longitudinally by turning the adjustment pins 36c, 37c, the left upper bracket 4 and the right lower bracket 4 can be adjusted relative to the fixed left lower bracket 4.

As shown in FIG. 7, the threaded rod 36b moves longitudinally together with the left upper bracket 4 by turning the adjustment pin 36c of the left upper adjustable support member 36, whereby through the longitudinal movement of the left upper bracket 4 relative to the fixed left lower bracket 4 the direction of a lens of the infrared camera 1L can be tilted vertically as illustrated by two-dot chain lines for fine adjustment in vertical direction.

In addition, when turning the adjustment pin 37c of the right lower adjustable support member 37, the right lower bracket 4 moves longitudinally relative to the fixed left lower bracket 4, whereby the direction of the lens of the infrared camera 1L can be tilted horizontally for fine adjustment in horizontal direction.

While the left-hand side infrared camera 1L has been described heretofore, the right-hand side infrared camera 1R is mounted on the sensor bracket 31R transversely symmetrically with the left-hand side one, and hence the right-hand side camera can also be tilted vertically and horizontally for adjustment in vertical and horizontal directions.

The bottom plates 32 of the sensor brackets 31L, 31R are placed on predetermined positions on an upper side of the front bumper beam 21 while the back plates 33 thereof are brought into abutment with the bulkhead upper frame 12 at predetermined positions on a front side thereof. Then, the bottom plates 32 are threadedly attached to the front bumper beam 21 with bolts 45 which have penetrated through the attachment holes 32a in the bottom plates 32 while the back plates 33 are threadedly attached to the bulkhead upper frame 12 with bolts 46 which have penetrated through attachment holes 33a in the back plates 33, whereby the sensor brackets 31L, 31R extend between the bulkhead upper frame 12 and the front bumper beam 21 so as to connect them together.

The left and right sensor brackets 31L, 31R are fixed at predetermined left and right positions between the bulkhead upper frame 12 and the front bumper beam 21, and the infrared cameras 1L, 1R are fixedly supported on the sensor brackets 31L, 31R, respectively. Thus, a relative distance D between the two infrared cameras 1L, 1R is maintained to a predetermined length.

As has been described heretofore, the bulkhead upper frame 12 and the front bumper beam 21 are directed transversely of the vehicle main body and connect to the wheel houses and the side frames 20L, 20R, thereby forming a strong structure at the front part of the vehicle body. Since the sensor brackets 31L, 31R are provided to extend between the bulkhead upper frame 12 and the front bumper beam 21 which are so constructed, an overall structure can be provided which is higher in rigidity.

Since the infrared cameras 1L, 1R are fixed to the sensor brackets 31L, 31R, respectively, which constitute the highly rigid structure, the infrared cameras 1L, 1R are fixed securely whereby the relative distance D can be maintained to the predetermined length in an ensured manner.

In addition, the highly rigid structure can be provided to thereby improve the rigidity of the overall vehicle body.

The left and right infrared cameras 1L, 1R provided on the front side of the upper portion of the front bulkhead frame 11 as has been described above are concealed below a front portion of a bonnet covering over an engine compartment, and confront the front grill 51 opened forwardly (external panels of the vehicle body are indicated by two-dot chain lines in FIGS. 1 to 4).

Consequently, the infrared cameras 1L, 1R can receive infrared rays directly without transmitting an obstacle such as glass, and hence, there being thereby no risk that the performance of the cameras is deteriorated.

Figure 8:
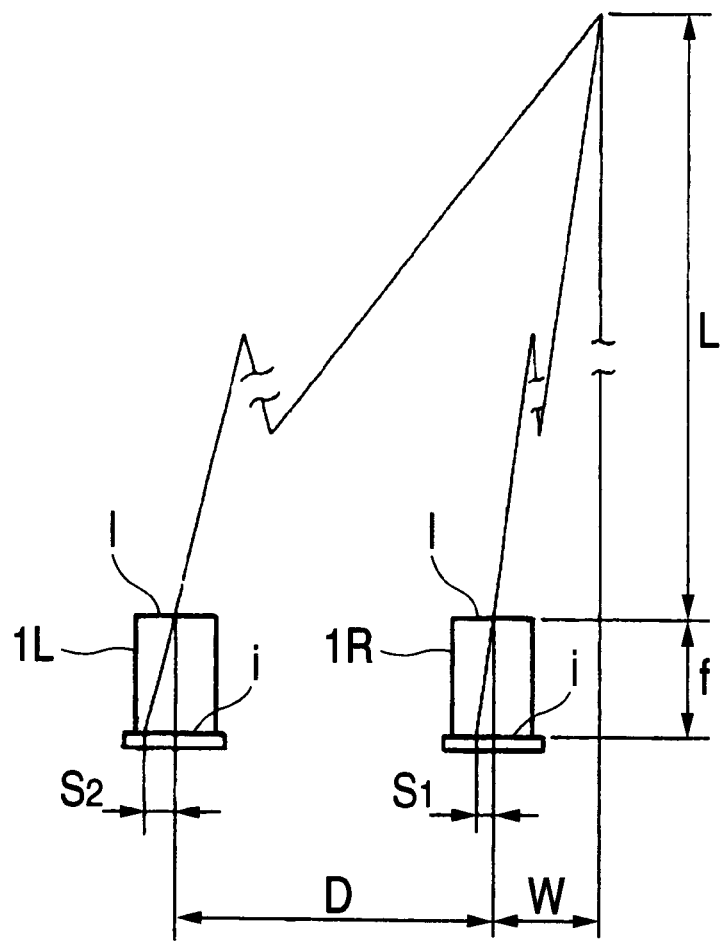
FIG. 8 is an explanatory view explaining a distance measuring method.

As shown in FIG. 8, the infrared cameras 1L, 1R which are spaced away from each other by the predetermined distance D receive infrared rays from an object such as a pedestrian walking ahead thereof through the lens 1, and an image of the pedestrian is formed on the surfaces of infrared detection elements i disposed second-dimensionally at a focal length f of the lens 1.

Assuming that a formed image of the object deviates a distance S1 from the center in the right-hand side infrared camera 1R whereas a formed image of the object deviates a distance S2 from the center in the left-hand side infrared camera 1L, a distance L to the object can be obtained as follows; $L = D \bullet f/(S2-S1)$.

Namely, assuming that a transverse deviation of the object from the right-hand side infrared camera is W, the following two expressions can be established;

$$(L+f)/(W+S1) = f/S1$$

$$(L+f)/(W+D+S2) = f/S2$$

and, the distance L can be obtained by deleting W from the two expressions.

While the distance is measured using the two infrared cameras 1L, 1R in the above embodiment, three or more cameras may be arranged in parallel to each other at predetermined intervals, so that measurement results obtained from a pair of cameras can be combined to obtain more reliable measurement results.

The measuring of distance can be implemented extremely quickly, and the measurement can be effected even in the dark because infrared rays are used.

As distance measuring sensors, in addition to the infrared cameras, CCD cameras and sensors such as radio sensors and radars may be used.

While only certain embodiments of the invention have been specifically described herein, it will apparent that numerous modifications may be made thereto without departing from the spirit and scope of the invention.

What is claimed is:

1. A distance measuring sensor mounting structure, comprising:

a bulkhead upper frame;

a front bumper beam situated below said bulkhead upper frame and diagonally to the front thereof;

at least two sensor brackets each having a distance measuring sensor fixedly supported thereon, wherein said at least two sensor brackets are installed at predetermined positions between said bulkhead upper frame and said front bumper beam to connect said bulkhead upper frame to said front bumper beam.

2. The distance measuring sensor mounting structure as set forth in claim 1, wherein each of said at least two sensor brackets comprises:

a bottom plate and a back plate which are disposed to form an L-shape as viewed from the side; and a rib connecting a side edge of said bottom plate to a side edge of said back plate, wherein said bottom plate is fixedly attached to said front bumper beam whereas said back plate is fixedly attached to said bulkhead upper frame.

3. The distance measuring sensor mounting structure as set forth in claim 1, wherein said distance measuring sensors supported on said sensor brackets are positioned so as to be concealed below a front portion of a bonnet covering over an engine compartment, and confront a front grill opened forwardly.

4. The distance measuring sensor mounting structure as set forth in claim 1, further comprising:

a front lower cross member extending substantially parallel to said bulkhead upper frame; and a center stay connecting respective central portions of said bulkhead upper frame and said front lower cross member, wherein said front bumper beam and said front lower cross member are connected to a pair of side frames.

5. The distance measuring sensor mounting structure as set forth in claim 1, wherein each distance measuring sensor is tiltable vertically and horizontally with respect to the sensor bracket on which it is fixedly supported.

6. The distance measuring sensor mounting structure as set forth in claim 2, wherein each of said at least two sensor brackets further comprises:

a reference support member attached to the vicinity of a corner of said back plate while fixing one end of a back surface of said distance measuring sensor;

a first adjustable support member attached to said back plate to be positioned horizontally with respect to said reference support member, and having a first rod extendable in a longitudinal direction thereof while abutting with the back surface of said distance measuring sensor; and a second adjustable support member attached to said back plate to be positioned vertically with respect to said reference support member, and having a second rod extendable in a longitudinal direction thereof while abutting with the back surface of said distance measuring sensor, whereby said distance measuring sensor is tiltable vertically and horizontally with respect to said sensor bracket.

* * * * *